United States Patent

Mandy

[11] Patent Number: 5,149,185
[45] Date of Patent: Sep. 22, 1992

[54] EMERGENCY HALL LIGHTING

[76] Inventor: Robert R. Mandy, 32750 Bingham La., Bingham Farms, Mich. 48025

[21] Appl. No.: 743,806

[22] Filed: Aug. 12, 1991

[51] Int. Cl.$^5$ .............................................. F21V 19/04
[52] U.S. Cl. ..................................... 362/20; 362/183; 315/86; 307/66
[58] Field of Search ................. 362/20, 183, 148, 251; 307/66, 64; 315/86

[56] References Cited

U.S. PATENT DOCUMENTS

| | | | |
|---|---|---|---|
| 3,486,068 | 12/1969 | Dunn et al. ............................ | 315/86 |
| 4,727,291 | 2/1988 | Bavaro .................................. | 362/20 |
| 4,890,200 | 12/1989 | Mandy .................................. | 362/183 |

Primary Examiner—James C. Yeung
Attorney, Agent, or Firm—Reising, Ethington, Barnard, Perry & Milton

[57] ABSTRACT

A hall lighting system includes a plurality of downlighting lamps all dedicated to hall illumination during normal power conditions. Each lamp is connected across a low voltage power source defined by the secondary winding of a stepdown transformer having its primary winding connected across a primary power source. When the primary power source is "on" an emergency lighting system has a triple pole double throw relay located in a normal lighting position in which two of the poles of the relay connect a charger to an emergency battery power source of a voltage less than the voltage across the secondary winding and a third pole of the relay connects the lamps across the secondary winding. When the primary power source is off, the first and second poles connect the emergency battery power source to selected ones of the lamps and the third pole disconnects the secondary winding from lamps such that the only load other than system wiring across the emergency battery power source is that of the selected ones of the lamps to provide a minimal lighting of the hall in excess of a set minimum footcandle standard for a period of time in excess of a set minimum lighting period.

4 Claims, 2 Drawing Sheets

EMERGENCY HALL LIGHTING

FIELD OF THE INVENTION

This invention relates to lighting systems and more particularly to lighting systems for halls having a plurality of downlighting lamps normally connected across a low voltage power source defined by a secondary winding of a stepdown transformer having its primary winding connected across a primary voltage source.

BACKGROUND OF THE INVENTION

Lighting systems for hallways often include a plurality of spaced lamps which are connected to a primary power source. In such cases, when the primary power source fails a back up battery powered emergency system is operated. Such systems include separately wired spot lights located in a position to provide a low level illumination in the hall for evacuation. In some cases the spot lights are located such that smoke pouring from one location could obscure the light and unnecessarily reduce the level of the hall illumination.

An alternative is to provide a downlighting system including a plurality of spaced low voltage lamps along the length of the hall to provide a softened lighting effect in the hallway under normal lighting conditions. Such lighting systems are set-forth in U.S. Pat. Nos. 4,890,200 and 5,003,432 issued to the inventor of the present invention. While suitable for their intended purpose, such lighting systems included a relay switch that connected the small dedicated lamps to an emergency battery power source when the primary power failed through a circuit network including the secondary winding of a step down transformer that powered the normal illumination lamps during operation of the primary power source.

Using the same lamps for both normal and emergency illumination, the illumination of the hallway under emergency conditions would be reduced undesirably unless the emergency battery were selected to have a voltage approaching that of the voltage across the secondary winding. Batteries with such voltage ratings and of the rechargeable type as required for low maintenance have a high initial cost which in the case of multiple installations in commercial buildings is prohibitive when compared to existing emergency lighting systems of the spot light type.

SUMMARY OF THE INVENTION

In the present invention, a hall lighting system includes a plurality of lamps all illuminated during normal lighting to provide a normal level of illumination along the length of the hallway. The lamps are all connected across a low voltage source defined by a secondary winding of a step down transformer having its primary winding connected across a primary power source. Selectively spaced lamps (every other one, for example) are connected across an emergency lighting system having a solenoid operated three pole double throw relay with first, second and third poles each having a normal illumination position and an emergency power position. The hall lighting system includes a circuit network in which the secondary winding is connected by the third pole to all of the lamps during normal lighting operation. The first and second poles are connected in the circuit network to connect a battery charger to an emergency battery power source during normal lighting operation when the step down transformer is energized by the primary power source.

In one aspect of the present invention the emergency battery power source has a voltage rating less than that of the voltage across the secondary winding of the step down transformer when it is energized. The emergency battery power source is of the rechargeable type and, in an emergency, powers two widely separated lamps that are connected only to the emergency battery whereby the initial cost of the emergency hall lighting system is minimized while minimizing its maintenance costs as opposed to prior art systems in which individual emergency battery power supplies are connected to each down light.

In another aspect of the present invention the third pole of the three pole double throw relay is operative in the circuit network to disconnect the secondary winding from the network while the first and second poles of the relay are operative in the circuit to simultaneously connect the emergency battery power source to the selectively spaced lights during emergency power lighting operation.

Conversely, when the primary power source is restored, the emergency lights are automatically relayed back to the transformer power supply and the battery in the emergency power supply is relayed back to the charger (now operative to supply charging current to the battery).

Thus, an object of the present invention is to provide an emergency lighting system for a hallway having a plurality of lamps therein located at spaced points therealong and including all of their filaments normally connected across the secondary winding of a stepdown transformer from a primary power source including a three pole double throw relay having first, second and third poles moveable between normal lighting and emergency lighting positions; and further including a battery charger energized by the primary power source for providing a charging current to an emergency battery power source having a lesser voltage than the voltage across the secondary winding of the step down transformer; the first and second poles connecting the emergency battery power source to the battery charger when the primary power source is restored and operative to connect selected lamps from the plurality of lamps to the emergency battery source when the primary power source fails; the third pole in its normal lighting position connecting the secondary winding to the plurality of lamps for illuminating them when the primary power source is restored; the third pole in its emergency lighting position disconnecting the secondary winding from the plurality of lamps such that the only electrical load across the emergency battery power source is selected lamps from the plurality of lamps whereby the level of illumination from said selected lamps is maintained at least one foot candle for a period in excess of 90 minutes.

Another object of the present invention is to provide an emergency lighting system for a hallway having a plurality of lamps therein located at spaced points therealong and including all of their filaments normally connected across the secondary winding of a stepdown transformer from a primary power source 110 volts (or more) characterized by a three pole double throw relay having first, second and third poles moveable between normal lighting and emergency lighting positions; a battery charger energized by the primary power source for providing a charging current and an emergency battery power source having a lesser voltage than the voltage across the secondary winding of said stepdown transformer; an armature connected to the first, second and third poles and a coil energized by the primary power source when restored to attract the poles to their normal lighting position wherein the charger is connected to said emergency battery and the lamps are connected across the secondary winding; a spring for moving the armature to position the first, second and third poles in their emergency lighting position when the primary power source is inoperative and the coil is deenergized to disconnect the charger from the emergency battery power source while connecting the emergency battery to selected lamps from the plurality of lamps for maintaining them at a reduced level of illumination during emergency conditions; the third pole in its normal lighting position connecting the secondary winding to the plurality of lamps for illuminating the lamps during normal operation of the primary power source; and the third pole in its emergency lighting position disconnecting the secondary winding from the plurality of lamps such that the only electrical load across emergency battery power source is selected lamps from the plurality of lamps whereby the level of illumination from these lamps is maintained at least one foot candle for a period in excess of 90 minutes.

Other objects, features and advantages of the present invention will be readily appreciated as they become better understood with reference to the following description when considered in conjunction with the accompanying drawings wherein:

DETAILED DESCRIPTION OF A PREFERRED EMBODIMENT

Figure 1:
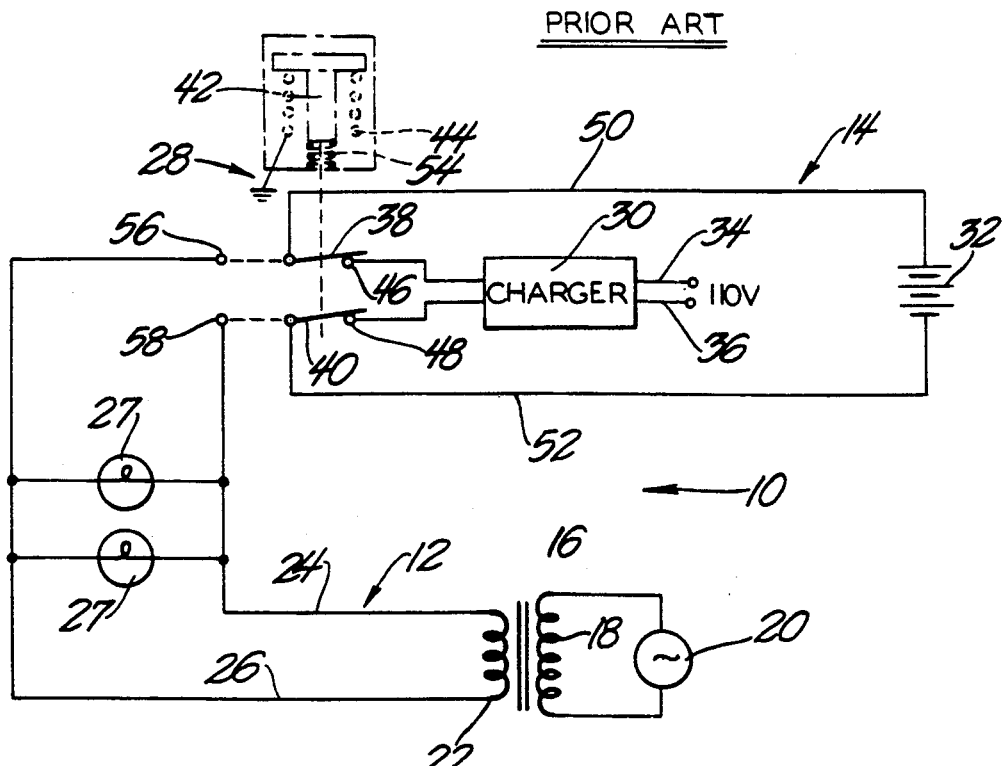
FIG. 1 is a wiring diagram of a prior art hall lighting system with an emergency power source.

Referring now to FIG. 1, an emergency lighting system 10 is illustrated including low voltage lighting circuit 12 and a standby battery power circuit 14. The low voltage lighting circuit 12 includes a step down transformer 16 having its primary coil 18 connected across a primary voltage source 20 that is a 110 volt alternating power supply in the illustrated embodiment. The secondary winding 22 of the transformer is connected by wires 24, 26 to opposite sides of 12 volt bulbs 27 that define the source of illumination in the emergency lighting system 10 as well as a low voltage primary illumination source when the primary voltage source 20 is on or restored.

The standby battery power circuit 14 includes a double pole, double throw relay 28 that selectively connects a battery charger 30 to either charge a gel cell (or cadmium nickel), rechargeable, direct current emergency power battery 32 or to connect the battery 32 to the wires 24, 26 when the primary power fails.

More particularly, the battery charger 30 has its input terminal connected to wires 34, 36 of a 110 volt power supply. The output terminals are connected to contacts 46, 48 which are electrically connected (by movement of armature 42, when coil 44 is energized) to poles 38, 40 which are connected to conductors 50, 52 respectively for providing a charging circuit between the anode and cathode terminals of the battery 32. When the main power fails, the coil 44 is deenergized and the armature is returned by a spring 54 in a direction to reposition the poles 38, 40 and to close normally open contacts 56, 58. The normally open contacts 56, 58, when closed, complete an emergency lighting circuit from the conductors 50, 52 through wires 24, 26 to energize the bulbs 27.

In the circuit of FIG. 1, during emergency lighting, the load of the secondary winding 22 remains in the circuit such that a substantial battery capacity is required to maintain an adequate emergency lighting illumination for a required time period.

Figure 2:
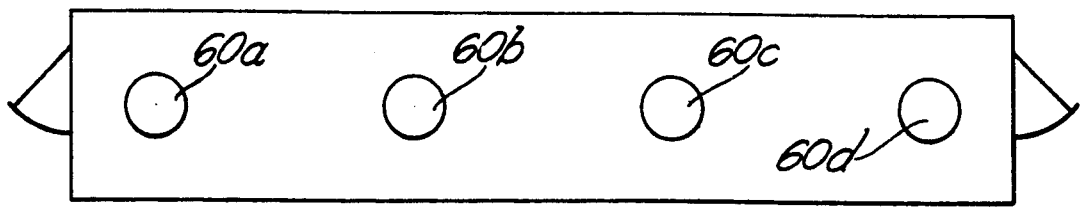
FIG. 2 is a lamp layout for an emergency lighting system of the present invention.

According to the present invention a hall lighting system as shown in FIG. 2 includes a plurality of spaced downlighting lamps 60a-60d, all of which are illuminating under normal operation. Alternate lamps, e.g., 60a and 60c are connected to an emergency lighting system 62 (FIG. 3) of the present invention including a circuit network 64 for providing regular lighting power to the lamps 60a-60d and a circuit network 66 for providing emergency lighting to the lamps 60a and 60c without connecting the load of a secondary winding in the circuit network 66. If desired, the four lamp arrangement and its associated circuitry described below can be repeated as many times as required to light a given hall length. More particularly, a three pole, double pole relay switch 68 is connected between the circuit networks 64, 66. The relay switch 68 has a normal lighting mode in which the three poles consisting of a first pole 68a, a second pole 68b and a third pole 68c are operatively associated with an armature 70 that is driven by a coil 72 connected to a primary power source 74 (in this embodiment a 110 volt alternating current supply). The power source 74 is also connected to a primary winding 75 of a step down transformer 76 having the secondary winding 77 thereof connected at one end to a wire 78 in the network 64 at a relay contact 80 which is normally closed against the third pole 68c when the coil 72 is energized so as to energize the lamps 60a-60c when the primary power is on. At the same time, the first and second poles 68a, 68b are connected to switch terminals 66a, 66b of the network 62 to connect a battery charger 90 to a rechargeable battery 82 such as the gel type or the cadmium nickel type. During emergency operation, the poles 68a, 68b are connected to switch terminals 66c, 66d to connect only lamps 60a, 60c to the battery 82.

When the main power fails, the relay 68 has an emergency mode in which the three poles 68a, 68b and 68c assume an emergency illumination position that locates the third pole 68c to an opened position to disconnect the load of the secondary winding from the lighting circuit and the lamps 60a, 60c are the only load connected across the battery 82 during failure of the main power source. As a consequence, the lamps have reduced illumination but at least one foot candle power of illumination (required by building codes) for a time period to provide for evacuation of the building. For extended hall lengths additional sets of four lamps 60a-60d and associated circuitry can be used so emergency lighting is provided throughout the length of the hall to aid evacuation of a building even though the halls are practically enveloped in smoke or the like.

Figure 3:
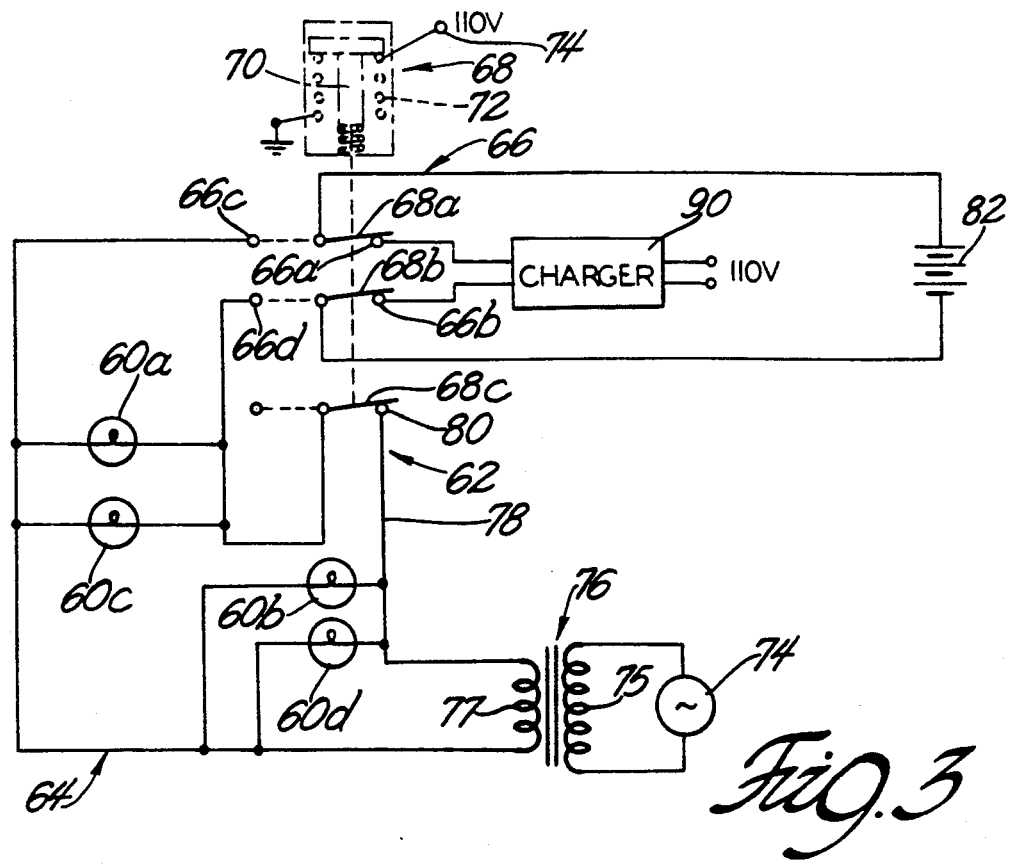
FIG. 3 is a wiring diagram of a hall lighting system with the emergency lighting circuit of the present invention.
Figure 4:
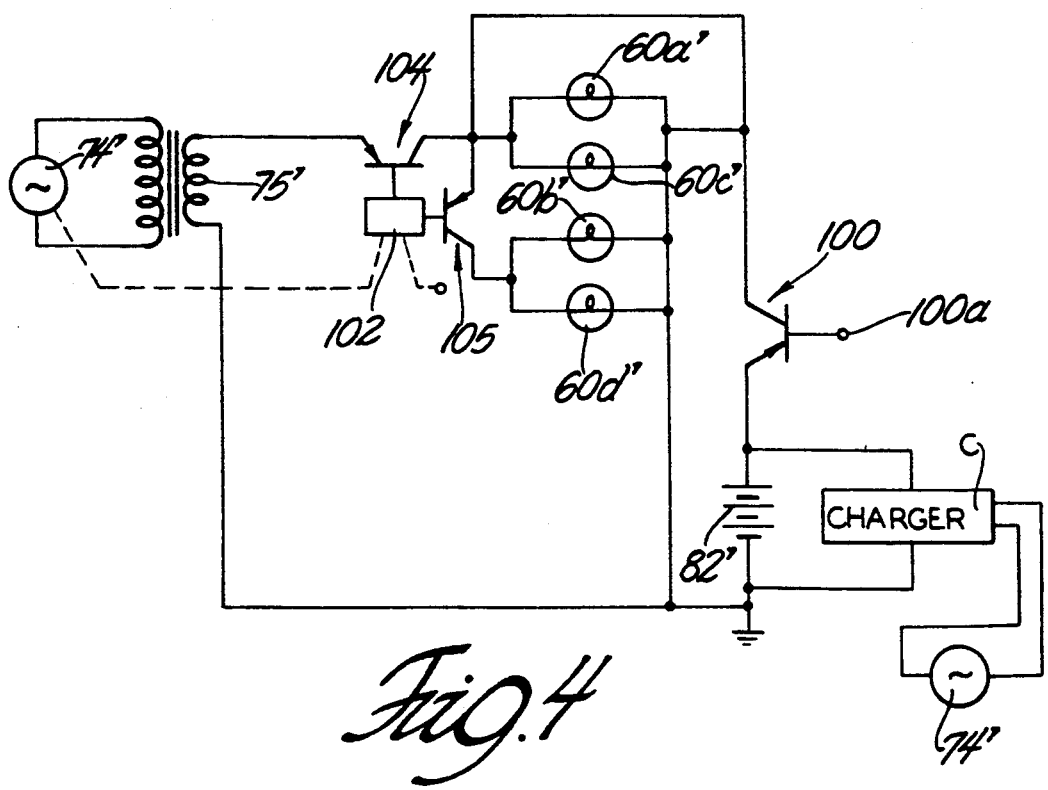
FIG. 4 is a wiring diagram of the hall lighting system including a solid state switching device.

While a relay switch is shown in the embodiment of FIG. 3, it will be readily understood that a solid state switch can be used to select the normal power mode and emergency power mode. In FIG. 4, the switch is constituted by transistors 100, 104, 105. An emergency power transistor 100 has its control terminal 100a connected to a controller 102 that will sense a power source 74' and produce a signal to open the transistor 100 during normal lighting. During normal lighting, lamps 60a'–60d' are all connected across secondary winding 75' to illuminate a hallway across power transistors 104, 105. The battery 82' is connected to a charger C having its input terminals connected across power source 74' during normal lighting.

When the power source 74' is off, the power transistor 100 is conductive and the power transistors 104, 105 are non-conductive. Then only the lamps 60a', 60c' are energized across an emergency power battery 82'.

In summary, the present invention provides a hall lighting system wherein all the lamps of a four lamp set are dedicated for illumination across a single transformer secondary winding. The corresponding relay operates to connect some of the lamps to an emergency battery power source while disconnecting the secondary winding and the other lamps from the emergency battery power source. Consequently, maximum hall illumination is provided by lower capacity emergency battery power sources.

What is claimed is:

1. In an emergency lighting system for a hallway the combination of a series of at least four spaced lighting fixtures each having an energizable incandescent lamp, a stepdown transformer having a secondary winding connected to a normal power source of at least 100 volts, said incandescent lamps all normally connected directly across the secondary winding of said stepdown transformer; switch means having power terminals for normal lighting and emergency lighting;

a battery charger directly energized by the primary power source for providing a charging current and an emergency battery power source having a lesser voltage than the voltage across the secondary winding of said stepdown transformer;

said switch means connecting said emergency battery power source to said battery charger when said primary power source is operative and connecting every other one of said at least four lamps to only said emergency battery source when said primary power source is inoperative;

said switch means in its normal lighting position connecting all of said at least four lamps for illuminating all of said lamps during normal operation of the primary power source; and said switch means during emergency lighting disconnecting said secondary winding from said plurality of lamps such that the only electrical load across said emergency battery power source is said every other one of said at least four lamps whereby the level of illumination from said lamps is maintained at least one foot candle for a period in excess of 90 minutes.

2. An emergency lighting system for a hallway comprising: a power source including a secondary winding; four lamps located at spaced points all normally connected directly across said secondary winding; switch means having a normal lighting mode and an emergency lighting mode;

a battery charger directly energized by the power source for providing a charging current and an emergency battery power source having a lesser voltage than the voltage across the secondary winding;

said switch means connecting said emergency battery power source to said battery charger when said primary power source is operating and connecting two lamps to only said emergency power source when said primary power source is inoperative;

said switch means in a normal lighting mode connecting said four lamps to the secondary winding for illuminating said four lamps during normal operation of the power source; and said switch means in an emergency lighting position disconnecting said secondary winding from two lamps such that the only electrical load across said emergency battery power source is two lamps whereby the level of illumination from said lamps is maintained at least one foot candle for a period in excess of 90 minutes.

3. An emergency lighting system for a hallway having a plurality of lamps therein located at spaced points therealong and including filaments normally connected across a secondary winding of a stepdown transformer from a primary power source of at least 110 volts comprising a three pole double pole switch having first, second and third poles moveable between normal lighting and emergency lighting positions;

a battery charger energized by the primary power source for providing a charging current and an emergency battery power source having a lesser voltage than the voltage across said stepdown transformer;

said first and second poles connecting said emergency battery power source to said battery charger when said primary power source is operative and connecting every other one of said plurality of lamps to said emergency battery power source when said primary battery source is inoperative;

said third pole in its normal lighting position connecting every one of said plurality of lamps to the secondary winding and the remaining lamps for illuminating said lamps during normal operation of the primary power source; and said third pole in its emergency lighting position disconnecting said secondary winding from said plurality of lamps such that the only electrical load across said emergency battery power source is every other one of said plurality of lamps whereby the level of illumination from said lamps is maintained at least one foot candle for a period in excess of 90 minutes.

4. An emergency lighting system for a hallway having a plurality of lamps therein located at spaced points therealong and including filaments normally connected across a secondary winding of a stepdown transformer from a primary power source of at least 110 volts or more comprising a three pole double pole relay switch having first, second and third poles moveable between normal lighting and emergency lighting positions;

a battery charger energized by the primary power source for providing a charging current and an emergency battery power source having a lesser voltage than the voltage across said stepdown transformer;

an armature connected to said first, second and third poles and a coil energized by said primary power source to attract said poles to their normal lighting position wherein said charger is connected to said emergency battery power source and all of said lamps are connected across said secondary winding;

a spring for moving said armature to position said first, second and third poles in their emergency lighting position when said primary power source is inoperative and said coil is deenergized to disconnect said battery charger from said emergency battery power source while connecting said emergency battery power source to every other one of said plurality of lamps for maintaining them at a reduced level of illumination during emergency conditions;

said third pole in its normal lighting position connecting said secondary winding to said plurality of lamps for illuminating said lamps during normal operation of the primary power source; and said third pole in its emergency lighting position disconnecting said secondary winding from said plurality of lamps such that the only electrical load across said emergency battery power source is two lamps whereby the level of illumination from said lamps is maintained at least one foot candle for a period in excess of 90 minutes.

* * * * *